Oct. 25, 1966    R. F. CAHILL ETAL    3,280,931
MODULAR STEERED WHEEL TRANSPORTER
Filed Nov. 27, 1963    8 Sheets-Sheet 1
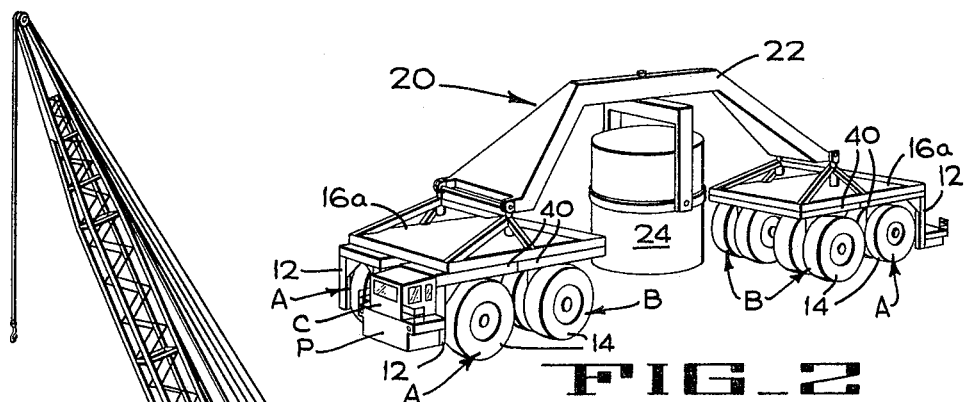
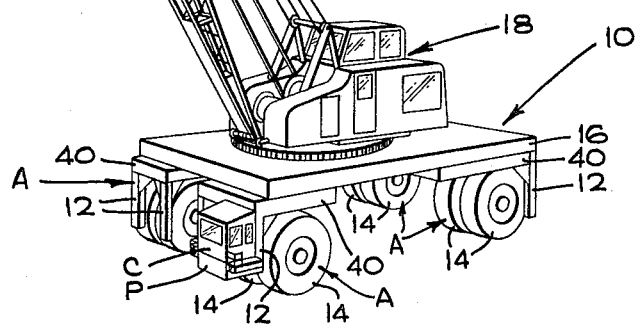
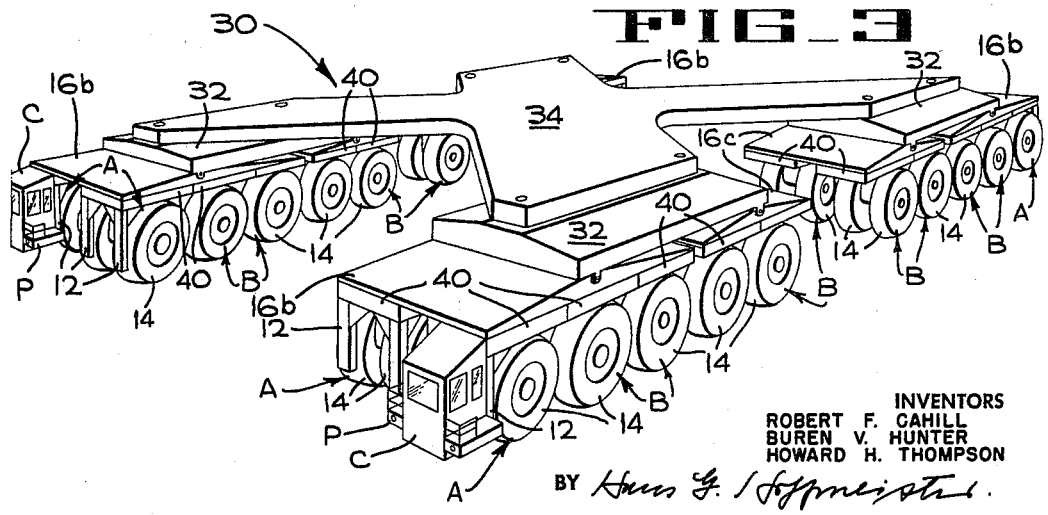
INVENTORS
ROBERT F. CAHILL
BUREN V. HUNTER
HOWARD H. THOMPSON
BY *Hans G. Hofmeister*
ATTORNEY Oct. 25, 1966  R. F. CAHILL ETAL  3,280,931
MODULAR STEERED WHEEL TRANSPORTER
Filed Nov. 27, 1963 8 Sheets-Sheet 2
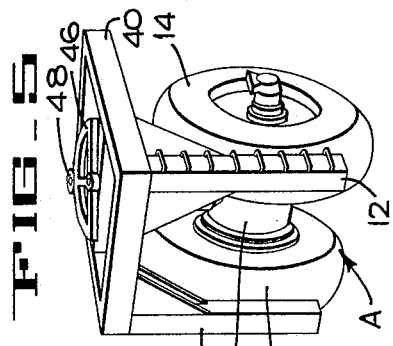
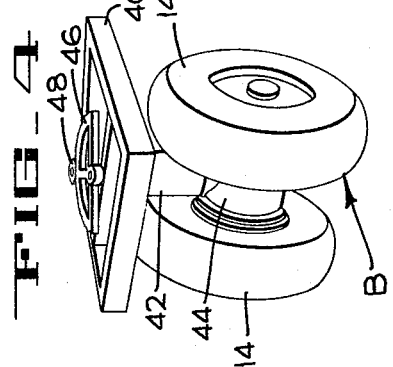
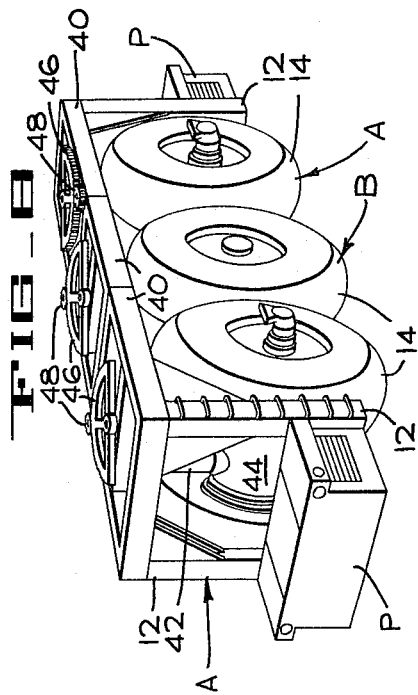
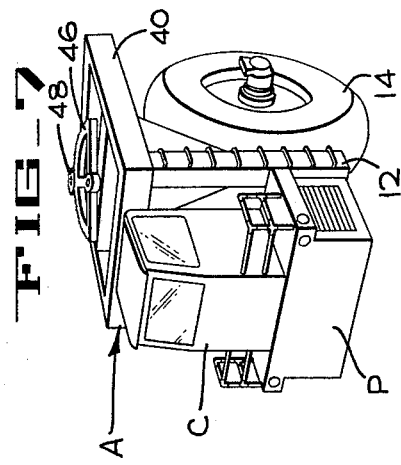
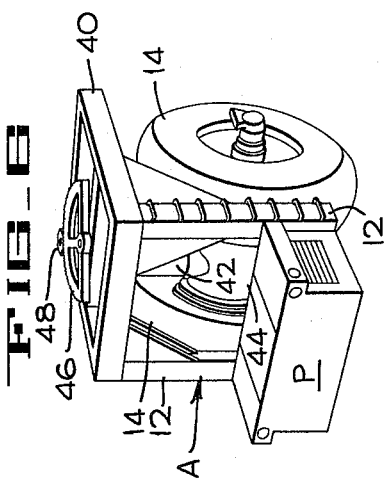
INVENTORS
ROBERT F. CAHILL
BUREN V. HUNTER
HOWARD H. THOMPSON
BY Hans G. Hoffmeister.
ATTORNEY

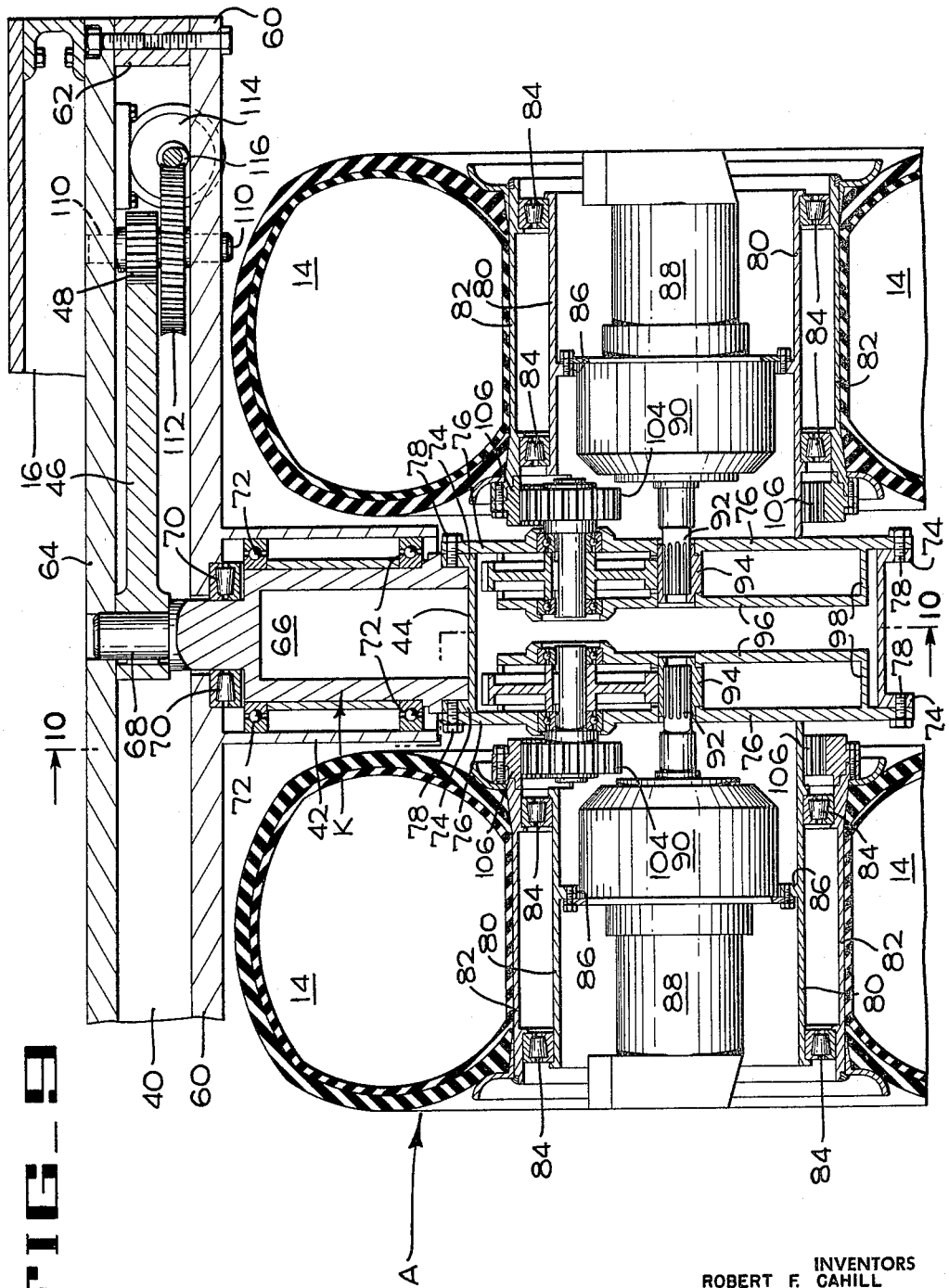

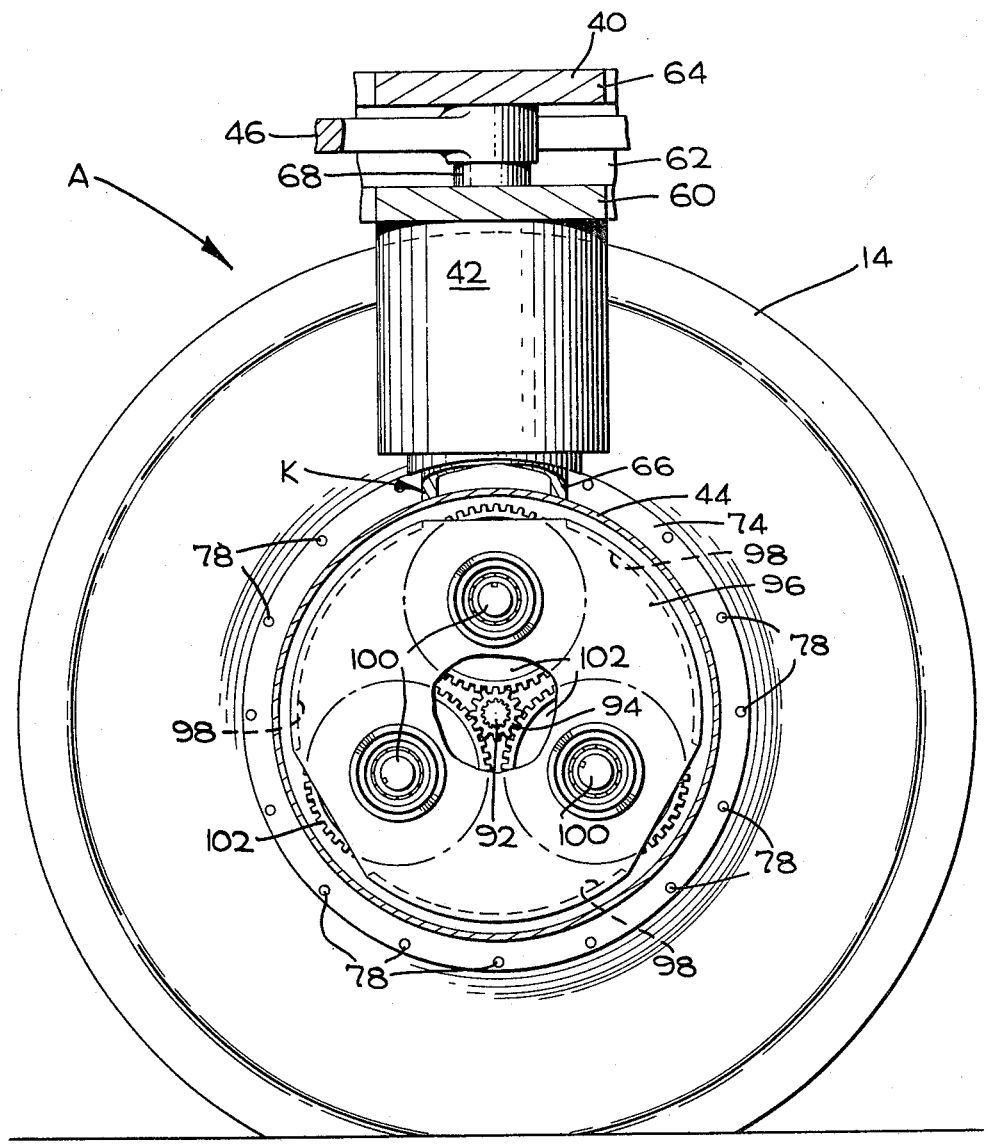

Oct. 25, 1966 R. F. CAHILL ETAL 3,280,931
MODULAR STEERED WHEEL TRANSPORTER
Filed Nov. 27, 1963 8 Sheets-Sheet 5
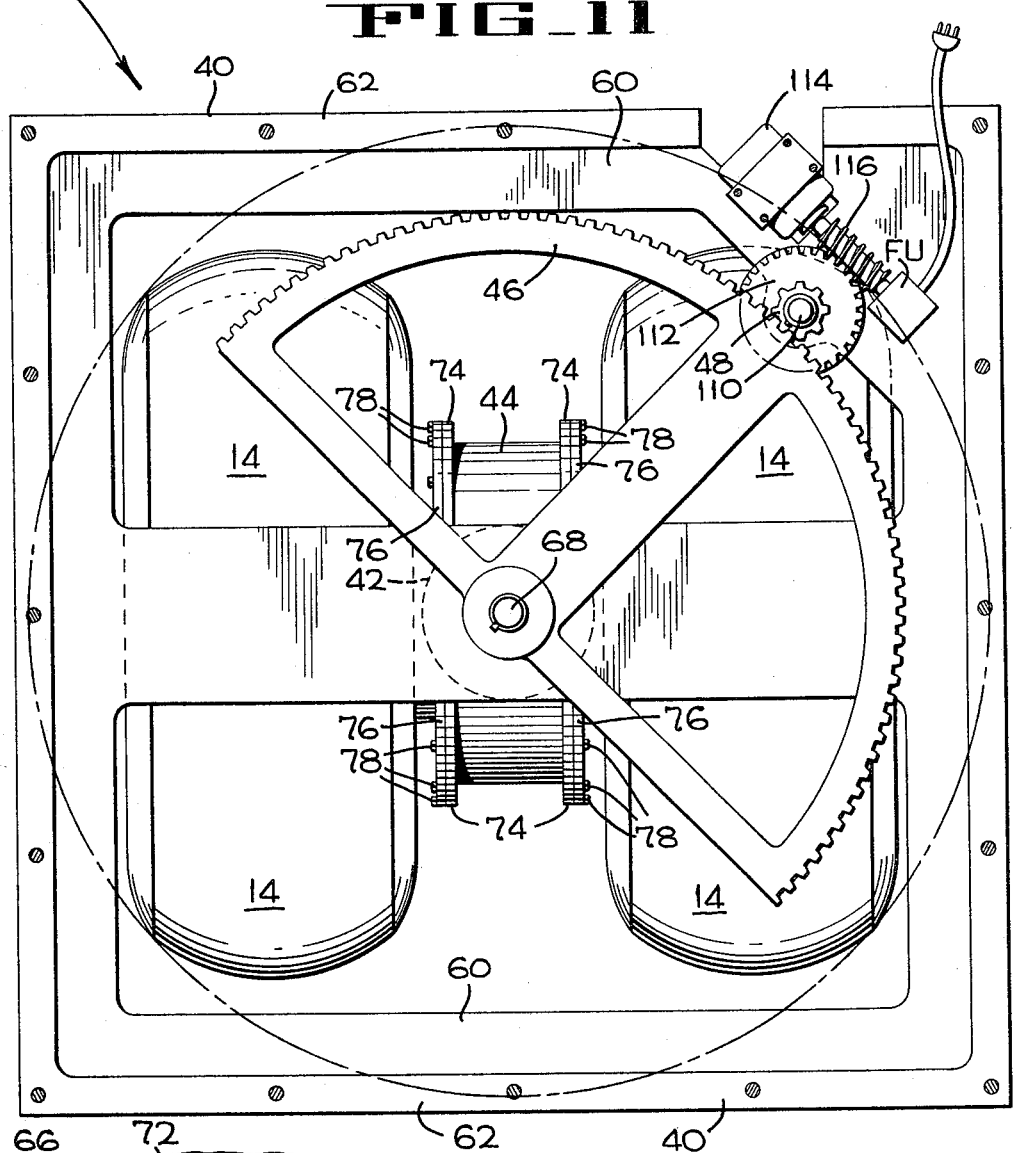
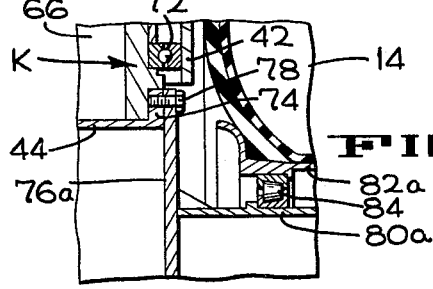
INVENTORS
ROBERT F. CAHILL
BUREN V. HUNTER
HOWARD H. THOMPSON
BY Hans G. Hoffmeister
ATTORNEY

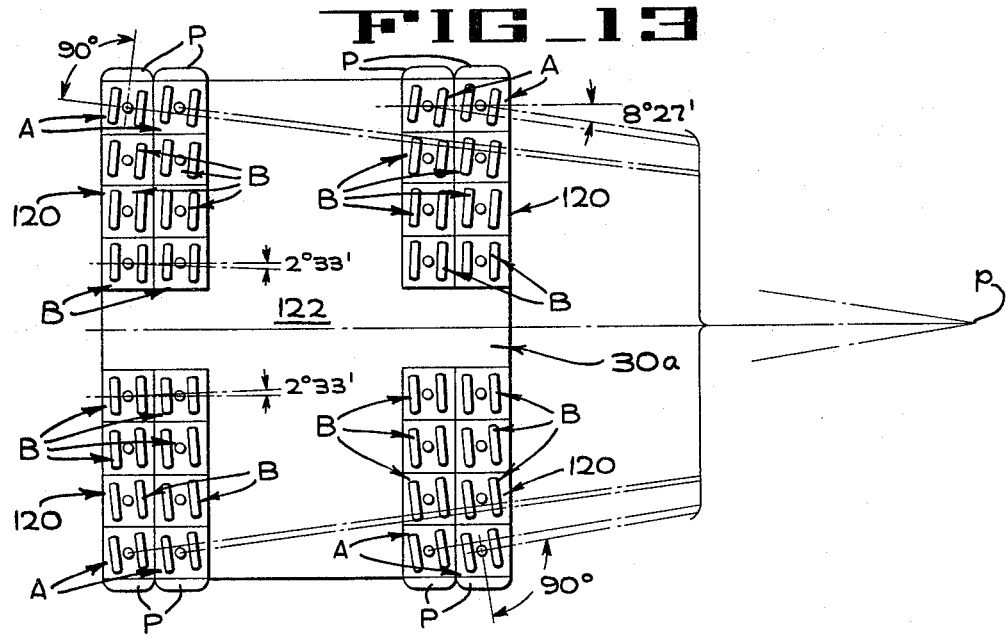
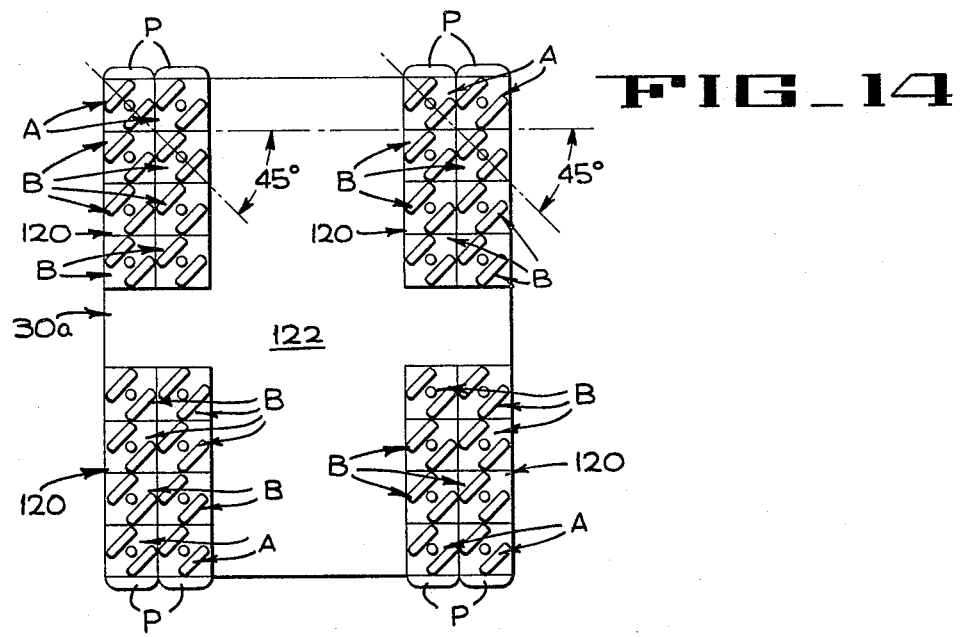

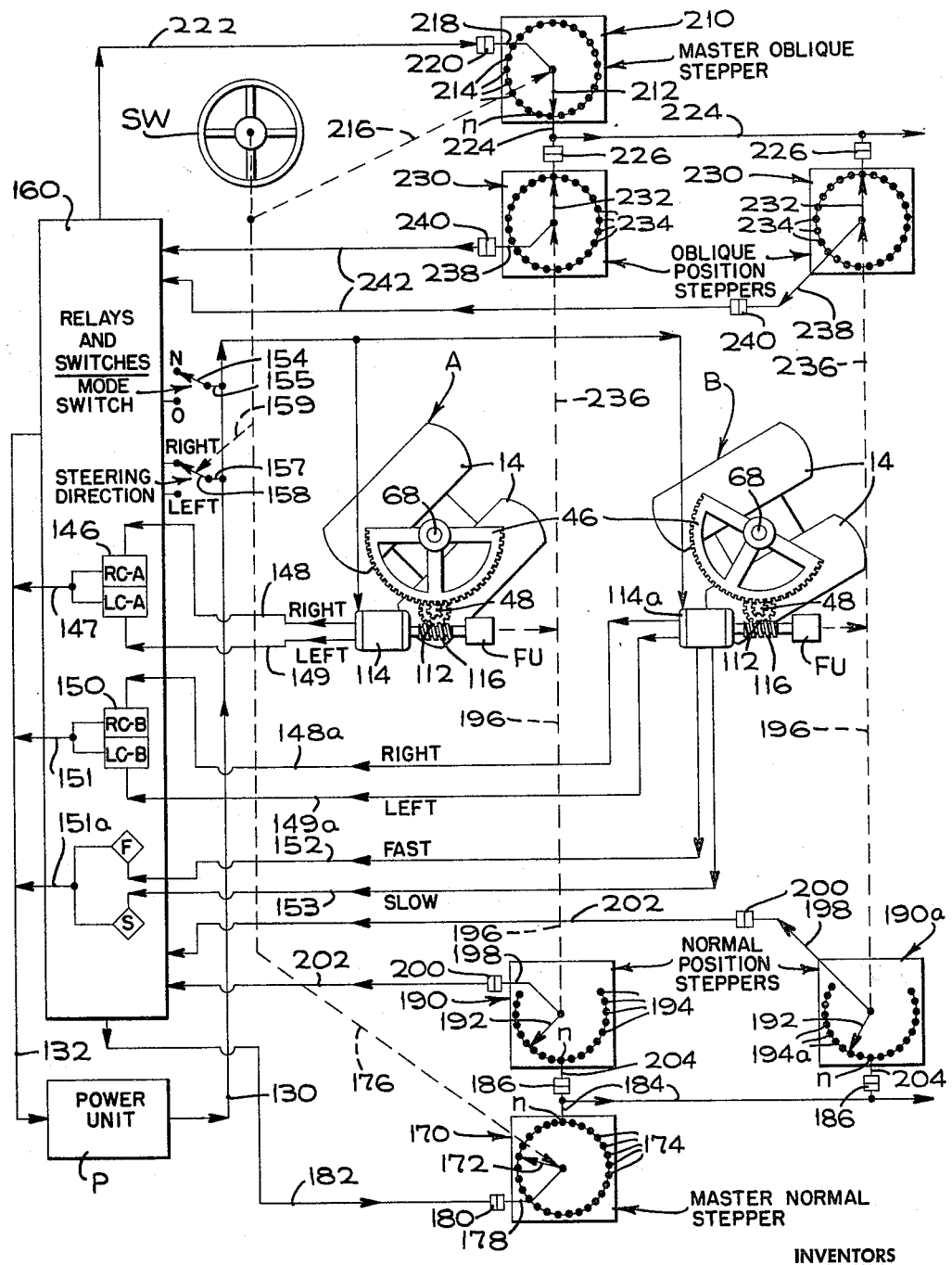
FIG_15

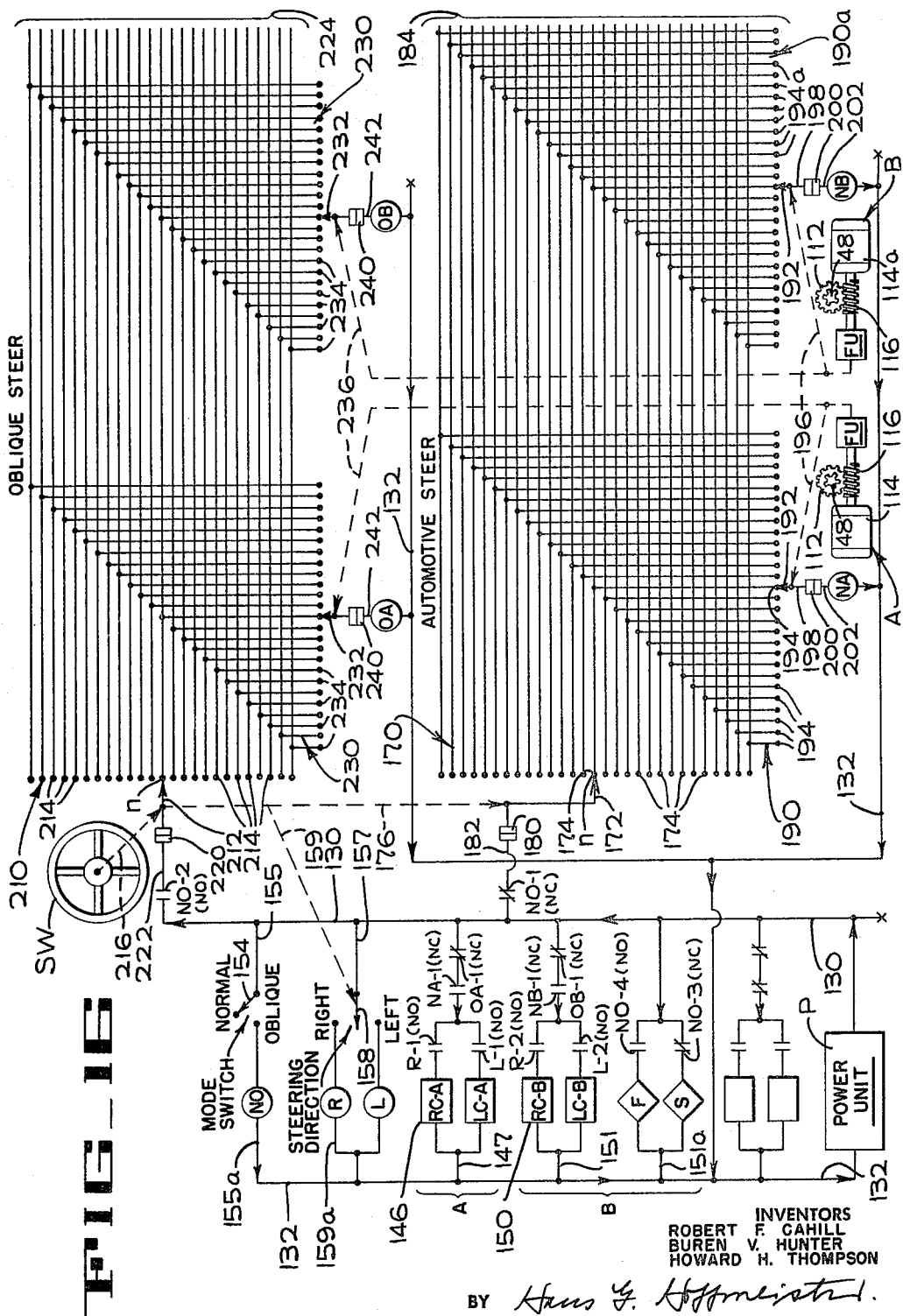

United States Patent Office 3,280,931
Patented Oct. 25, 1966

3,280,931
MODULAR STEERED WHEEL TRANSPORTER
Robert F. Cahill, Los Altos, Buren V. Hunter and Howard H. Thompson, San Jose, Calif., assignors to F.M.C. Corporation, San Jose, Calif., a corporation of Delaware
Filed Nov. 27, 1963, Ser. No. 326,508
19 Claims. (Cl. 180—23)

This invention relates to motor vehicles, and more specifically to motor vehicles of the driven-steering wheel type. Vehicles of the present invention are particularly suitable for use in transporting extremely heavy loads, and the vehicle chassis is built up of modular units or sub-chassis in accordance with the load requirements, to provide a modular steered wheel transporter.

It is an object of the invention to provide a transporter capable of carrying large, heavy loads such as space booster rockets, cranes, space vehicles, rocket erector launchers, rocket segment handlers, fuel transporters and other bulky, heavy equipment.

Another object is to provide a transporter of the type described that has a versatile, modular design, and which can be built up of a simple, economical and reliable units or sub-chassis for handling a large range of loads.

A further object is to provide transporter of the type described wherein various sub-chassis or units are interchangeable.

Another object is to provide a transporter that employs rubber tired wheels in a compact light weight sub-chassis assembly, and which minimizes the driving horsepower required to move the transporter over the ground.

It is an object of the present invention to provide a transporter that substantially provides precision steering of the wheels of the individual sub-chassis, which steering is readily adaptable to the length of an assembled modular transporter. This reduces tire wear and rolling resistance to a minimum during operation of the vehicle.

A further object of the invention is to provide a modular transporter of the type described which can be built up of two basic modules or sub-chassis, namely, an end module and an intermediate module (if required) with individually steered wheel and axle assemblies in each module. Each module may be either powered or non-powered, as required.

It is a further object of the invention to provide end chassis or modules as referred to above, which can mount the prime movers such as a motor generator set, and also can mount a control cab, as dictated by the design of the assembled transporter.

Another object of the invention is to provide a universal versatile, power steering system in combination with the modular transporter of the type described.

It is an object of the invention to provide a transporter which, dependent upon tire size, can handle loads in the range of 50 to 10,000 tons, at speeds of from one or less to ten or more miles per hour. The speeds and loads will depend upon the ground surface, and the number of modular units assembled.

It is an object of the present invention to make possible the assembly of transporters that will accommodate a large range of loads and weights and sizes, from a minimum number of standardized modular units.

It is another object of the invention to facilitate connection of a plurality of modular sub-chassis together to form a heavy duty vehicle. This is made possible by providing power driven steering and individual wheel driving units on each modular chassis, a prime mover and motor generator unit on at least one of the end chassis, and at least one control unit on one of the end chassis. Detachable electrical connections can be established between the control unit and each chassis for power steering controls.

Another object of the present invention is to provide a sub-chassis that incorporates compact and rugged electric drive assemblies.

A further object is to minimize the length of the vehicle considering the load for which it is designed. This can be accomplished by mounting one or more motor generator power units on a depending frame extension of one or more end chassis, and by mounting the control unit or cab on top of the motor generator unit.

The manner in which these and other objects can be accomplished by the present invention will be apparent to those skilled in the art from following detailed description of the invention.

FIG. 1 is a perspective of a transporter embodying the invention, designed for carrying a crane.

FIGURE 2 is a perspective of a transporter embodying the invention designed as a rocket segment handler.

FIGURE 3 is a perspective of a transporter embodying the invention designed as a rocket handler.

FIGURE 4 is a simplified perspective of an intermediate unit sub-chassis or module, of the non-powered type. In FIG. 4 the steering gears are shown diagrammatically, and above their actual mounting position for clarity.

FIGURE 5 is a perspective of an end unit, module or sub-chassis of the powered type.

FIGURE 6 is a simplified perspective of an end sub-chassis mounting a power unit, such as a motor generator set.

FIGURE 7 is a simplified perspective of a unit like that of FIGURE 6 that mounts a control cab above the power unit.

FIGURE 8 is a simplified perspective of an assembly of two end and one intermediate sub-chassis of modules.

FIGURE 9 is a vertical section through a powered sub-chassis, with the steering gears of the steering assembly rotated into the plane of the section for clarity.

FIGURE 10 is a section taken on lines 10—10 of FIGURE 9.

FIGURE 11 is a plan of the chassis unit of FIGURES 9 and 10, with the top plate removed.

FIGURE 12 is a fragmentary vertical section through a non-powered sub-chassis, or modular unit.

FIGURE 13 is a diagram of a transporter involving the invention in which the wheels are turned for normal or automotive type steering.

FIGURE 14 is a diagram like that of FIGURE 13 wherein the wheels are turned for oblique steering.

FIGURE 15 is a diagram of the power circuit for the steering control system.

FIGURE 16 is a wiring diagram of the control circuit for the steering system.

FIGURE 1 is a perspective of a transporter 10 embodying the present invention designed for mounting a crane. The transporter of FIGURE 1 includes a pair of forward sub-chassis or end modules A, each of which has a downwardly extending end extension 12. Each chassis A mounts a pair of heavy duty pneumatic tired wheels 14. In the vehicle shown in FIGURE 1, the depending extension 12 of the left hand forward end chassis A mounts a power unit P, which may be a motor generator set, and resting upon the power unit P is a control cab C.

The vehicle in FIGURE 1 has four sub-chassis A, one in each corner thereof, and is provided with a connecting platform 16, the construction and details of which do not form part of the invention. Mounted upon the platform 16 is a crane 18. The transporter 10 of FIGURE 1 has 8 wheels and may use tires as large as 36 inches in section, with 41 inch rims. Even larger wheels may be employed wherein the tires are 44.5 inches in section, mounted on 45 inch rims. An 8 wheeled vehicle so equipped will carry up to 1,200,000 pounds gross load.

The vehicle 20 of FIGURE 2 is a steered wheel modular transporter embodying the invention and designed to transport rocket components, or similar loads. This vehicle includes fore and aft platforms 16α. The forward platform 16α mounts a pair of end sub-chassis A, and an intermediate sub-chassis B. The intermediate sub-chassis B lacks the downward extension 12 that forms part of the end sub-chassis A. The power unit P and a control cab C is mounted on one of the forward end chassis A, as previously described. In the transporter 20, the rearward platform 16a also mounts a pair of intermediate chassis B, and a pair of end chassis A having downward extensions 12. As illustrated, no power units are mounted on the rearward end chassis A, but these can be added as required.

The platforms 16a are connected in tandem by a bridge 22, which supports a load 24, such as a rocket component. The transporter 20 has 16 wheels, and when employing tires of the larger size referred to, will carry a load in excess 1,600,000 pounds.

FIGURE 3 shows a rocket transporter 30 embodying the invention, although no load is shown on the vehicle. The vehicle 30 of FIGURE 3 is made up of four chassis assemblies, each of which mounts 20 heavy duty pneumatic tired wheels. The two forward vehicles assemblies include a platform 16b, each of which mounts two end chassis A and four intermediate chassis B. The extension 12 of one of the end chassis A of each forward assembly mounts a power unit P and a control cab C. The forward vehicle assembly also includes a rearward platform 16c which mounts four intermediate chassis B. A bridge member 32 connects the platforms 16b and 16c in tandem. There are two rear vehicle assemblies which are like those just described, except that in the transporter illustrated in the FIGURE 3 no control units are mounted on either of the rear vehicle assemblies. A large deck 34 is pivotally connected to each of the bridge members 32 for supporting the load and providing accommodation for rough ground. The transporter 30 of FIGURE 3 includes 160 heavy duty tired wheels, and will transport up to 12 million pounds at low speeds.

Any of the transporters described, and all of the transporters of the present invention, may incorporate wheel leveling devices such as those described in Patent No. 3,246,906 assigned to the assignee of the present invention.

Additional details of the modular nature of the vehicles of the present invention and of the sub-chassis or modules going up to make the vehicle will now be described.

FIGURE 4 illustrates an intermediate sub-chassis B. This chassis includes a horizontal frame 40, from which depends a king post mounting tube 42, rotatably mounted in the tube 42 is a king post K (FIG. 9) to be described in detail presently, and which includes a wheel axle mounting tube or barrel 44. The king pin post K is rotated by a sector steering gear 46, and a pinion 48 meshed with the sector gear. As previously mentioned, in FIG. 4 and in FIGS. 5 to 8, the steering gears are shown displaced upwardly from their normal position, for clarity.

FIGURE 5 shows one of the end chassis A in which a frame 40 carries the downwardly projecting end extension 12, previously referred to. The end chassis A (FIG. 5) and the intermediate chassis B (FIG. 4) (powered or non-powered) form the two basic chassis modules of the transporter of the present invention. The power and control units are the other basic modules.

FIGURE 6 shows an end chassis A with a power unit P, such as a motor generator set, mounted on a downward extension 12 of the chassis.

FIGURE 7 shows a control cab C supported by the power unit.

FIGURE 8 shows an assembly of two end chassis A, and an intermediate chassis B, with power unit P mounted on the two end chassis A. Of course, if desired, the assembly of FIG. 8 need mount only a single power unit.

In FIGURE 8, both end chassis A are powered, whereas the intermediate chassis B is of the non-powered type. The king posts of all three chassis are individually steered by remote control, as will be described presently.

FIGURES 9 to 11 shows the constructional details of an end chassis A of the powered type. The horizontal frame 40 of the end chassis A of FIGURE 9 includes a lower plate member 60, a plate spacer 62 and an outer plate member 64 to which a platform such as platform 16 is bolted. The king post is illustrated generally as K, and includes a sleeve 66 terminating in a stub shaft 68, the latter extending through bores in the lower and upper plates. Shaft 68 mounts the steering sector gear 46. The steering pinion 48 is likewise mounted in plates 60 and 64, and is shown in FIGURE 9 as rotated into the plane of the section, and meshing with the sector gear 46 in this plane.

In order to support the frame 40 on the king post K, a tapered roller thrust bearing 70 is provided between the upper end of sleeve 66 and frame plate 60. The sleeve 66 of the king post K is rotatably mounted in the tube 42 which depends from the frame 40, by means of a pair of radial thrust bearings 72.

The axle mounting barrel 44 is welded to the sleeve portion 66 of the king post, and wheel mounting rings 74 are welded to each side of the barrel 44. An axle support plate 76 is detachably secured to each ring 74 by means of studs 78. A stub axle sleeve 80 is welded and projects from each of the axle support plates 76, which sleeves mount tire rims 82 of conventional heavy duty construction. The tire rims 82 are mounted on the stub axle sleeves 84 by means of an opposed pair of tapered roller bearings 84, which bearings are held in place on each sleeve 80 by conventional means.

In order to support the drive motor in the driven type unit being illustrated, a flange 86 projects inwardly from each axle sleeve 80. Bolted to the flange 86 is an electric motor 88, which also mounts an internal gear reducer unit 90. The output or driving shaft 92 from the gear reducer unit 90 is splined and projects into an internally splined pinion 94. Pinion 94 is rotatably mounted in bores in the axle support plate 76, and in a spider plate 96. The spider plate 96 is welded to a generally cylindrical, apertured connector plate 98, which plate is welded to the axle support plate 76 and supports the spider plate 96, from the axle support plate 76.

In order to provide additional gear reduction between the gear reducer 90 and the wheel rim 82, a countershaft 100 is rotatably mounted in bearings in the axle support plate 76 and the spider plate 96. A gear 102 is keyed to the countershaft 100 and is mounted between the plates 76 and 96. The gear 102 is meshed with the driving pinion 94. Externally of the axle support plate 76, a pinion 104 is mounted on the countershaft 100, and meshes with an internal ring gear 106 that is bolted to the inner flange portion of the tire rim 82. Thus it can be seen that the individual drive of each wheel, on each sub-chassis or module of the power driven type, is by means of a reversible motor 88, a primary speed reducer 90 (the details of which do not form part of the present invention), a driving pinion 94, a countershaft gear 102, a countershaft pinion 104, and a ring gear 106 on the tire rim.

The steering mechanism has been partially described and the complete steering structure is shown in FIGURES 9 and 11. A countershaft 110 is mounted in bores in the frame plates 60 and 64, which shaft mounts the steering pinion 48, meshed with the steering sector gear 46, previously referred to. Connected to rotate with the steering pinion 48 on countershaft 110 is a worm wheel 112. The worm wheel 112 is driven by a reversible remotely controlled electric motor 114, which motor drives a worm 116 that is meshed with the worm wheel 112. The motor 114 is bolted to the frame assembly 40, the mounting connection being to the upper plate 64 as shown in the drawings. The motor also drives a response signal into a steering follow-up control FU, to be described in detail presently.

This completes the description of the details of a powered sub-chassis assembly, A. The steering and power driving details of an intermediate power driven sub-chassis B are identical to those just described. The motor 88 can be remotely controlled from a cab C by a system of controls, the details of which are not important to the present invention. The reversible steering motor 114 can also be remotely controlled from the cab, to provide a substantially precise steering for each module in either the automotive or the oblique steering modes. In the normal or automotive mode of steering, the degree of steering of each pair of wheels depends upon its position in the vehicle relative to the mid point of the vehicle. Details of the control system for the steering motors for each steering motor will be explained presently.

An end chassis unit A of the powered type has been described in detail. FIGURE 12 is a fragmentary vertical section showing those portions of a non-powered unit, which differ from the corresponding portions of a powered unit. As seen in FIGURE 12, a modified axle support plate 76a is bolted to each ring 74 on the king pin K, but the plate 76a does not carry any driving gear, as in the case of the plate 76 of the power driven unit. A stub axle sleeve 80a is welded to, and projects laterally from each of the plates 76a. A heavy duty tire rim 82a of conventional construction is mounted on sleeve 80a by means of bearings 84, which are of the tapered roller type like that previously described in connection with FIGURES 9 to 11.

The steering system

FIGURE 13 is a diagram showing the wheels turned for normal or automotive type steering. In this diagram, a transporter 30a is shown which includes four sub-chassis assemblies 120. Each assembly 120 includes two end units A, and six intermediate units B. A platform 122, the details of which are not important to the invention connects the four sub-chassis assemblies 120 to form the transporter.

The steering system of the present invention makes it possible to adjust the steering angle of each set of wheels of units A and B, forming the various sub-chassis, so that the vehicle 30a as a whole turns around a common turning point p. Each pair of wheels on a king post is turned so that the wheel plane is 90 degrees to a radius drawn through the king post and the vehicle turning center point p. In the example given in FIG. 13, theoretically each pair of wheels turns through a different angle, as measured from a lateral centerline or from the straight ahead position on the vehicle. For example, the wheels of the forward and rearward sub-chassis A may turn to an angle of 8 degrees 27 minutes, which represents the maximum angle of turn. The minimum angle of turn is taken by outside wheels nearest the lateral center line, this angle being 2 degrees 33 minutes in the example.

It is a feature of the present invention that a power driven follow up system is provided wherein each pair of wheels assumes an individual or unique steering angle, so that the wheels will turn around the common turning point p.

However in some vehicles, it may not be necessary that each individual pair of wheels be turned to a different angle from the angle turn of adjacent wheels, because the large tires characteristic of the transporter of the present invention will accommodate a certain amount of missteering. However, and as will be seen, the steering system of the present invention can be set up to provide individual steering for each pair of wheels or if desired, or follow-up controls can be installed so that selected groups or pairs of wheels all turn through the same angle, without causing undue tire scuffing and wear during the turning action.

FIGURE 14 is a diagram like that of FIGURE 13 wherein all pairs of wheels are turned through the same angle (45 degrees is the example given), which causes the vehicle to move in a straight line, but at an angle of 45 degrees to its fore and aft center line, or to its lateral center line if the latter is taken as the reference. As will be seen, the steering system of the present invention provides for the operator's selection of either normal steering mode of FIGURE 13, or the oblique steering mode of FIGURE 14.

Power circuit

FIGURE 15 is a schematic diagram of the power circuit for the steering assemblies of a transporter embodying the present invention. A power unit P is shown in the diagram, from which extends power lines 130, 132. Also shown in the diagram is one sub-chassis A having a single speed reversible motor 114, which chassis is assumed to be at or adjacent the forward or rearward end of the vehicle, and therefore requires a relatively large turning angle for a normal or automotive type steering. In FIGURE 15, an intermediate sub-chassis B is also shown diagrammatically, the wheels of which assume a smaller turning angle in the normal or automotive steering mode. These wheels are steered by a two speed steering motor 114a. The steering motors 114, 114a may be either of the direct current or the single or multi-phase alternating current types. Both motors are reversible to execute right or left turns, in response to the operation of the steering control circuits.

The single speed motor 114 employed in unit A is controlled by contactors or starters 146, that are connected to power line 132 by a line 147, and are connected to the motor 114 by a right steering line 148 and a left steering line 149. Of course, these lines are diagrammatic in case of multi-phase motors.

The two speed motor 114a for sub-chassis B is controlled by a contactor assembly 150, which is connected to power line 132 by a line 151, and which is connected to a two speed motor 114a by right and left steering lines 148a, 149a, respectively. The speed of the two speed motor 114a of sub-chassis B is controlled by fast and slow speed contactors F and S, which are connected to power line 132 by a line 151a, and to the motor 114a by fast and slow lines 152, 153 respectively. The speed change device itself forms no part of the present invention. Suitable A.C. motors and two-speed, reverse controls are manufactured by a number of suppliers as conventional equipment.

The direction starter or contactor unit 146 for the motor 114 on sub-chassis A includes a contactor RC–A. When energized by the control circuit of FIGURE 16 (to be described), starter contactor RC–A starts the steering motor 114 in such a direction as in turn the wheels for steering to the right. Similarly, a starter or contactor LC–A performs the same function for turning the wheels of sub-chassis A to the left. Similar starters or contactors RC–B and LC–B are provided in the starter unit 150 for the two speed motor 114a of sub-chassis B. The manner in which the right and left contactor units 146, 150, and the fast and slow contactors F and S, are energized to control the steering motors 114, 114a will be explained when the control circuit of FIGURE 16 is described.

Although it also forms part of the control circuit of FIG. 16, also illustrated in FIGURE 15 is a mode switch 154, which has a movable pole connected by a line 155 to one of the power lines 130. This switch is manually operated by the operator to select either the normal (automotive) mode of steering, or the oblique mode of steering. The switch is illustrated at the normal or automotive position "N."

Also indicated diagrammatically in FIGURE 15 is a steering direction switch 158, the pole of which connects by a line 157 to one of the power lines 130. This switch is mechanically connected to the steering wheel SW by mechanical connection illustrated diagrammatically at 159. The switch 158 is of the over running or friction actuated type. For example, when the steering wheel is returned to the right, the mechanical connection 159 turns the switch arm or pole of the steering direction switch 158, and brings it against the Right contact. Further turning of the steering wheel SW leaves the arm of the steering direction switch 158 at the Right contact, and a mechanical connection 159 to the switch arm slips or acts as an over running friction clutch and permits continued turning of the steering wheel SW without damage to the switch. A similar action occurs when the steering wheel is turned to the left, causing the switch arm of the steering direction switch 158 to engage the Left contact. An assembly 160 of relays and switches is included in the control circuit, but these are not illustrated in detail in FIGURE 15, but are merely indicated diagrammatically by a panel 160.

Although they functionally form part of the control circuit, a series of follow-up remote control stepper switches for causing the steering motors for the various wheel units to assume the desired angle of steer are also shown in the diagram of FIGURE 15.

As mentioned, the follow-up or remote control for the steering system employed in the embodiment invention being described is one that uses a simple system of master and follow-up, or position stepping switches. The principle of operation is simply that in each steering mode, the steering wheel mechanically offsets the arm of a master stepping switch. This unbalances a control circuit, starts the steering motors in the proper direction, and each steering motor mechanical response signal operates the follow-up or position stepper switch for each set of wheels. Motion of each steering motor continues until its position stepper switch reaches a contact that represents the desired angle of turn of the associated wheels, whereupon the control system shuts itself off, and the steering motors stop.

Referring to FIGURE 15, the normal automotive steering system includes a master normal stepper switch 170, having a rotary switch arm or pole 172 and a circular array of contacts 174. The switch arm 172 is of the shorting type, which bridges two adjacent contacts and therefore insures that the system will continue in operation until the position error of the steered wheels has been removed by the follow-up action. Shorted stepping switches of this type are well known, and the details thereof form no part of the present invention.

The master normal stepper switch 170, and all of the follow-up or position stepper switches in the control circuit, have a neutral position indicated at "n," which represents a straight ahead motion of the transporter. As mentioned, a number of contacts 174 surround the center of the switch, and are engaged by the switch arm 172. These contacts are divided into two groups that are centered about the neutral position contact "n." A mechanical connection 176, which connection is a branch of connection 159 leading to the steering direction switch 158, operates the switch arm 172 of the master normal stepper 170. The mechanical connecting means 176 to the switch arm 172 is geared (by means not shown) so that the position of the switch arm 172 can be considered to represent the desired angular position of the associated wheels 14.

A signal line 178 leads to the arm 172 of the master normal stepper switch 170, and the line is connected to a connector 180. A power line 182 leads from the relay assembly 160 to connector 170, and hence to the signal line 178 and switch arm 172. The function of these lines will be explained when the control circuit is described in connection with FIGURE 16.

The leads from contacts 174 of the master normal stepper switch 180 are brought together into a cable 184, which has several branch cable connectors 186 for connection to a series of normal position steppers, one for each controlled wheel assembly.

A normal position stepper switch 190 is associated with the wheels of sub-chassis A. This switch has a rotatable switch arm 192, and a circular array of contacts 194. A mechanical connection 196 extends from an output shaft of the steering motor 114 of sub-chassis A, to the arm 192 of the normal position stepper switch 190, so that the position of the switch arm 192 will represent the position to which the wheels of sub-chassis A have been turned during the steering cycle. A position signal line 198 leads from the stepper switch arm 192 to a connector 200, the connector being connected to a signal line 202 leading to the relay and switch assembly 160. The leads from the contacts 194 are brought together into a cable 204, which plugs into the connector 186 branching from the cabled leads from the contacts 174, of the master normal stepper switch 170.

A normal position stepper switch 190a having a switch arm 192 that is mechanically operated by the steering motor 114a of sub-chassis B, and a circular array of contacts 194a is also provided. This switch and its connections are like those of the stepper switch 190, except that since the wheels 14 of sub-chassis B associated with stepper switch 190a need not turn as far as must the wheels associated with the sub-chassis A, the contacts 194a of the position stepper switch 190a are closer together than are the contacts 194 of the position stepper switch 190. However, the number of contacts in both switches 190 and 190a is the same. Thus when the arms 192 of the stepper switches 190, 190a step off an equal number of contacts, the arm 192 of switch 190 associated with sub-chassis A will have turned through the greatest angle, and therefore, the associated wheels will have turned through a greater angle, before the follow-up system shuts itself off in a manner to be described presently. This system eliminates the need for changing the mechanical response or follow-up gearing between wheels, only plug-in electrical components need be varied.

As previously mentioned, the steering drive motor 114a for the wheels of sub-chassis B is a two speed motor. As will be explained in the description of the control circuit shown in the diagram of FIGURE 16, since the wheels 14 of sub-chassis B need not turn as far as the wheels of the sub-chassis A, when the system is in its normal or automotive steering mode, motor 114a will have been shifted to slow speed operation, so that the wheels 14 of sub-chassis A turn more rapidly than do the wheels of sub-chassis B, during the normal steering cycle.

When the mode switch 154 is switched to the oblique steering position "O," control is shifted over to the series of oblique stepper switches. This series includes a master stepper switch 210 controlled by the steering wheel, and an oblique position stepper switch 230 for each set of vehicle wheels. The oblique steering system is like that for the normal or automotive type of steering, just described except that the spacing of the contacts of both the master and oblique positioned steppers are the same, and the steering motors all operate at their normal or fast speed. The master oblique stepping switch 210 has a contact arm 212, which is mechanically operated by steering wheel SW by a mechanical connection 216. The master oblique switch 210 has a circular array of contacts 214. A position signal line 218 is connected to the switch arm 212 of master stepper 210. The line 218 terminates in a connector 220, which connects to a power line 222 leading from the relay and switch assembly 160. The leads from the contacts 214 of the master switch are brought into a cable 224, which has a number of branch cable connectors 226 for connection to the various oblique position steppers 230.

Each position stepper switch 230 has a rotatable switch arm 232, and a circular array of contacts 234. The arm 232 is mechanically driven from the associated steering motor by mechanical connection 236, so that the position of the arm 232 represents the position of the vehicle wheels 14 on the associated sub-chassis.

A switch arm position signal line 238 leads from the arm 232 of each oblique position stepper 230, and terminates in a connector 240, which connects to a position signal line 242 leading to the relay and switch assembly 160.

As has been briefly mentioned, when the steering wheel SW is turned to a given position in either mode of steering, the associated rotating switch arms 172, 212 in both the master and oblique stepper switches assume a corresponding angular displacement from a neutral position "n." Through means of the mechanical follow-up connections in the control circuits described, the steering motors of each sub-chassis turn their associated wheels until the follow-up or position switch arms 192, 232 step off the same number of contacts that were stepped off by the master switch arms 172 and 212. When the aforesaid number of contacts have been stepped off, the system shuts itself off, and the vehicle progresses in the desired direction, in either the normal or the oblique steering mode, dependent upon the selection of the mode switch 154.

Control circuit

Certain details of the control circuit, specifically the relays and switches, previously indicated as being in a panel 160, are illustrated only in the control circuit steering diagram of FIGURE 16. This circuit employs conventional parts and the connections of these parts and the mode of operation will be explained simultaneously. Assume that the mode switch 154 is set for normal or automotive type steering, position "N." Referring to FIGURE 16, it can be seen that with this setting, a normal-oblique relay NO, which is connected by a line 155a to one of the power lines 132, is de-energized. With this setting of the mode switch, normally open contacts NO-2 connected between power line 130 and a line 222 leading from the switch arm 212 of the master oblique stepper switch 210 remain open, so the master oblique steering system is de-energized. However, normally closed contacts NO-1 connected between power line 130 and the line 182 leading to the switch arm 172 of the master normal switch 170, remain closed. This connects the switch arm 172 to the power line 130 and energizes the master normal stepper switch 170.

Assume that the vehicle is moving straight ahead, and that the steering wheel is in its central or neutral position. Then neither the right nor the left of the steering direction switch will be closed. With the master normal stepper 170 energized as mentioned above, the contact 174 at the neutral position "n" is energized, and is connected into a corresponding contact 194 of the normal position stepper 190. Cables 184 and 204, and connector 186 (FIG. 15), are omitted in FIG. 16 for clarity. The condition just described energizes a relay NA in the position stepper switch line 202 previously described, and opens a normally closed contact NA-1 in a line that connects the direction of contactors 146 to the power line 130. A similar action occurs with relays NB and contact NB-1 and contactor 150 for chassis B. Thus with relay NA and NB energized, which occurs when the master and follow-up switch arms are matched, the steering motors 114, 114a do not turn, and the vehicle continues in a direction indicated by the position of the steering wheel SW, namely, the straight ahead position in this case.

Assume now that the steering wheel SW is rotated to perform a right turn. The arm or pole of the steering direction switch 1958 is now brought against the Right turn contact, which energizes a steering direction relay R by means of lines 159, 159a. A normally open contact R-1 in the line for the right-hand direction contactor or starter RC-A is now energized, setting up the starter circuit for the steering motor 114.

When the steering wheel SW was turned as above, the switch arm 172 for the normal master stepper 170 was moved away from its neutral position "n," which de-energizes the associated contact 174, and hence de-energizes a connected contact 194 in the normal position stepper 190. The relay NA in the line of the stepper follow-up contact 192 is now de-energized, causing normal enclosed contact NA-1 in the line for energizing the right-hand direction contactor RC-A to close. The normally closed contact OA-1 in the same line remains closed when the mode switch is set in the normal steering position. This is because the Normal-Oblique relay NO, in the mode switch line 155, 159a is de-energized, with the mode switch set for "normal," and normally open contact NO-2 in lines 222, 220 leading to the oblique steering control master stepper remains open. When contact NO-2 is thus open, relay OA in line 242 leading from the arm 232 of the oblique position stepper 230 is de-energized, causing the normally closed contacts OA-1 to remain closed, as described above.

The normally open contacts R-1 closed by the steering direction switch, the normally closed contacts NA-1 which are permitted to close by offsetting of the master normal stepper switch arm 172, and the normally closed contacts OA-1 which remain closed because the mode switch is set in the normal steering mode, all complete a power circuit through the contactor RC-A for starting the steering motor 114. When motor 114 is energized by starter RC-A, the steering motor turns in the direction for turning the wheels to the right, in accordance with the connections illustrated diagrammatically in FIG. 15, and previously described.

The same action occurs at the right turn directional contactor RC-B for controlling the motor 114a associated with the intermediate steering sub-chassis B.

The steering direction relay L is not energized, because the steering wheel SW is turned to the right; therefore, normally open contacts L-1 and L-2 for the left direction contactors LC-A and LC-B remain open, so that these contactors are de-energized during the right turn. As to steering motor 114a, the slow speed contactor S is energized through a normally closed contact NO-3, which causes the steering motor 114a to operate at its slower speed. This is desirable because the steering motor 114a is not required to turn the associated wheels through as large an angle as is the steering motor 114 associated with sub-chassis A. As mentioned, the normally closed contact NO-3 remains closed because the mode switch relay NO is de-energized when the system is in normal or automotive-type steering. A normally open contact NO-4, in the circuit for the fast relay F, remains open for the same reason.

When the associated steering motors, 114, 114a have driven the arms 192 of the normal position steppers 190, 190a to the particular contacts 194, 194a that connect to the particular master stepper contact 174 engaged by the arm 172 of the master normal stepper, circuits will be completed through the master stepper, and the position or follow-up relays NA and NB will again be energized. Energization of these relays opens the normally closed switches NA-1 and NB-1 in the lines to the direction contactors RC-A and RC-B, respectively. This drops out the steering motors 114, 114a, and the vehicle continues in a direction corresponding to the new position of the steering wheel SW.

A similar, but opposite action occurs when the steering wheel SW is moved in the opposite direction from whatever position it has previously assumed. When this occurs, the pole or arm of the steering direction switch 158 engages the Left contact, and the steering direction relay L is energized. This sets up the direction contactors LC-A and LC-B for sub-chassis A and B, respectively, and causes the vehicle to turn to the left in the manner just described in connection with the description of a right turn. The turning ceases when the switch arms 192 of the follow-up or normal position steppers 190, 190a reach positions corresponding to the position imparted to the switch arm 172 of the master normal stepper 170. As mentioned, the switch arms 192 of the normal position steppers 190, 190a are driven from the steering motors through suitable gearing, so that the steppers act as signal responsive follow-up devices.

It has previously been mentioned that the contacts 194a of the normal position stepper 190a for the sub-chassis B are closer together than are the corresponding contacts 194 of the normal position stepper 190. This difference in the angular contact spacing adjusts the angular degree of turn of each set of wheels to correspondence with the geometrical position of the set of wheels on the vehicle proper, relative to a lateral centerline. It can be seen that in the steering control circuit of the present invention, each set of wheels can be precisely steered to the geometrically optimum angle, and that all that is required for procuring this result is the installation of selected normal position or follow-up steppers at each wheel unit. These steppers can be plugged in parallel into cables 184, branching from the contacts 174 of the master normal stepper unit 170.

When the mode switch 154 is set for oblique steering, the Normal-Oblique relay NO is energized. This opens the normally closed contact NO-1 that energizes the master normal (automotive) steering stepper 170, and closes the normally open contact NO-2 that energizes the master oblique steering stepper 210. Simultaneously the normally closed contact NO-3 that previously energized the slow speed contactor S for steering motor 114a of sub-chassis B is opened, and the normally open contact NO-4 for the fast speed contactor F is closed. Thus all steering motors 114, 114a will now turn at the same or faster speed.

The mechanical offsetting of the switch arm 212 of the master oblique stepper 210 by steering wheel SW, and the follow-up action of the switch arms 232 of the oblique position steppers 230, are like that just described in connection with the explanation of normal steering, and a detailed description of this action is unnecessary. As before, the direction of turning is determined by the positioning of the arm of the steering direction switch 158, by the mechanical connection 159 from the steering wheel SW, previously described.

The number of contactors employed in the oblique mode of steering need not be as great as those employed in the automotive or normal mode of steering, because no relative degree of differential precision is required. Enough contacts are provided in the normal steppers to provide steering increments of 30' of arc, whereas an increment of 7½° of arc is sufficient in the oblique mode. These figures are mere examples. All of the oblique stepper switches can be alike, and the gear ratio between the steering motors and the follow-up arms 232 can be such that a full 90° or more turn in either direction is possible. This type of steering provides for linear translation of the transporter, and since the transporter can also be turned about a common point when in the normal or automotive-type steering mode, the steering system provides for flexible and universal maneuverability of the transporter.

As the modules or sub-chassis are assembled to make up a given type vehicle, the various normal position steppers 190, 190a, etc are plugged into the branch line 184 from the master normal steppers 170, as previously described, so that a precisely steered universal-type vehicle is readily provided.

As previously mentioned, in large vehicles it may not be necessary to individually steer each set of wheels in the automotive or normal mode of steering. Under these circumstances, one or more adjacent normal position stepper switch wafers may have their contacts equally spaced, or a single steering motor can be connected to drive the gears of one or more of adjacent units or sub-chassis.

Having completed a detailed description of the invention, it can be seen that we have provided a heavy-duty transporter of the modular type, which is both flexible in design and in maneuverability, and which can be assembled from a relatively small number of basic modules or sub-chassis, and other components to produce a range of vehicles having wide load handling characteristics. Since both powered and non-powered units are available, and since one or more master motor generator or other power units can be provided, as well as a number of control units, extreme flexibility without need for a large inventory is made possible by the present invention.

Having completed a detailed description of the invention so that those skilled in the art may practice the same, we claim:

1. A modular pneumatic tired transporter comprising a plurality of modular unit chassis, each chassis having a frame, a king post rotatably mounted in said frame, axle means projecting laterally from said king post, a pair of pneumatic tired wheels mounted on said axle means, a remotely controllable motor driven steering apparatus on said frame for turning said king post, means for connecting a plurality of said chassis together end to end, a driving motor and wheel drive assembly on a plurality of said chassis, a power unit on one chassis for the motors of a plurality of chassis, a control unit on said one chassis for a plurality of chassis, said control unit including manually operated steering means, and a follow-up steering control connected between the steering means on said control unit and the motor of each steering apparatus, said follow-up steering control including means for causing the steering apparatus of each chassis to bring the associated wheels substantially into a plane that is perpendicular to the radius from a common turning point, for each position of said manually operated steering means.

2. The transporter of claim 1 wherein said follow-up steering control also includes means for causing the steering apparatus of each chassis to bring the associated wheels substantially into parallel planes, for each position of said manually operated steering means.

3. The transporter of claim 1 wherein a plurality of said chassis are connected by said connecting means in a side by side as well as in an end to end relationship.

4. The transporter of claim 1 wherein the forward chassis has a horizontal frame and an extension projecting downwardly from the frame, and wherein said power unit is mounted on said extension and said control unit is mounted on said power unit.

5. A modular pneumatic tired transporter comprising a plurality of modular unit chassis, each chassis having a frame, a king post rotatably mounted in said frame, axle means projecting laterally from said king post, a pair of pneumatic tired wheels mounted on said axle means, electrically driven steering apparatus on said frame for turning said king post, means for connecting a plurality of said chassis together, an electric wheel drive assembly on a plurality of said chassis, an electric power unit on one chassis for a plurality of chassis, a control unit on said one chassis for a plurality of chassis, said control unit including manually operated steering means, and a follow-up steering control connected between the steering means on said control unit and each steering apparatus, said follow-up steering control including means adjusted in accordance with the position of each chassis on the transporter for causing the steering apparatus of each chassis to bring the associated wheels substantially into a plane that is perpendicular to the radius from a common turning point, for each position of said manually operated steering means.

6. The transporter of claim 5, wherein said chassis are mounted end to end, and wherein said power and control units are mounted on an end chassis.

7. The transporter of claim 5 wherein said follow-up steering control also includes means for causing the steering apparatus of each chassis to bring the associated wheels substantially into the same plane, for each position of said manually operated steering means.

8. A modular pneumatic tired transporter comprising a plurality of modular unit chassis, each chassis having a generally horizontal frame, a king post rotatably mounted in said frame, axle means projecting laterally from said king post, a pair of pneumatic tired wheels mounted on said axle means, steering apparatus on said frame for turning said king post, platform means for connecting a plurality of said chassis together end to end, the frame of the chassis at one end of the chassis assembly having an extension projecting downwardly from the free end thereof, a motor and wheel drive assembly on a plurality of said chassis, a power unit for the motors of a plurality of chassis mounted on a lower portion of said end chassis extension, and a control unit for a plurality of chassis mounted on said end chassis extension.

9. The transporter of claim 8 wherein an intermediate chassis which is free of downwardly projecting end extensions is also connected to said platform means.

10. A modular pneumatic tired transporter comprising a plurality of modular unit chassis, each chassis having a frame, a king post rotatably mounted in said frame, axle means projecting laterally from said king post, a pair of pneumatic tired wheels mounted on said axle means, motor driven steering apparatus on said frame for turning said king post, means for connecting a plurality of said chassis together end to end, a motor and wheel drive assembly on a plurality of said chassis, an extension projecting downwardly from the free end of the frame of a chassis at one end of the chassis assembly, a power unit for the motors of a plurality of chassis mounted on the lower portion of the extension of said end chassis, a control unit for a plurality of chassis mounted on said power unit, and said control unit including manually operated steering means, and a follow-up steering control connected between the steering means of said control unit and each steering apparatus motor.

11. A modular pneumatic tired transporter comprising a plurality of modular unit chassis, each chassis having a frame, a king post rotatably mounted in said frame, axle means projecting laterally from said king post, a pair of pneumatic tired wheels mounted on said axle means, power driven steering apparatus on said frame for turning said king post, means for connecting a plurality of said chassis together end to end, an electric wheel drive assembly on a plurality of said chassis, the frame of one end chassis having a downwardly projecting extension, a motor-generator unit for a plurality of chassis mounted on the extension of said end chassis, a control unit for a plurality of chassis mounted on an end chassis, said control unit including manually operated steering means, and a follow-up steering control connected between the steering means of said control unit and each steering apparatus, said steering control including means for causing the steering apparatus of each chassis to bring the associated wheels substantially into a plane that is perpendicular to the radius from a common turning point, for each position of said manually operated steering means.

12. The transporter of claim 11, wherein said follow-up steering control also includes means for causing the steering apparatus of each chassis to bring the associated wheels substantially into the same plane, for each position of said manually operated steering means.

13. A modular pneumatic tired transporter comprising a plurality of modular unit chassis, each chassis having a generally horizontal frame, a king post rotatably mounted in said frame, axle means projecting laterally from said king post, a pair of pneumatic tired wheels mounted on said axle means, power driven steering apparatus on said frame for turning said king post, means for connecting a plurality of said chassis together end to end, the frame of the forward and rearward end chassis each having an extension projecting downwardly from the free end thereof, an electric wheel drive assembly on a plurality of said chassis, an electric power unit for a plurality of chassis mounted on a lower portion of an end chassis extension, and a control unit for a plurality of chassis mounted on the extension of the forward end chassis.

14. The transporter of claim 13, wherein a power unit is mounted on the extension of the rearward end chassis.

15. The transporter of claim 13, wherein a power unit is mounted on the extension of the forward end chassis, and said control unit is mounted on said forward power unit.

16. A modular pneumatic tired transporter comprising a plurality of end and intermediate modular unit chassis, each chassis having a frame, a king post rotatably mounted in said frame, axle means projecting laterally from said king post, a pair of pneumatic tired wheels mounted on said axle means, steering apparatus on said frame for turning said king post, platform means for connecting a plurality of said chassis together end to end, an electric wheel drive assembly on a plurality of said chassis, an electric power unit for a plurality of chassis mounted on an end chassis, electric motors for driving the steering apparatus of each chassis, means for operating the end chassis steering motors more rapidly than the intermediate chassis steering motors, a control unit for a plurality of chassis mounted on an end chassis, said control unit including manually operated steering means, and a follow-up steering control connected between the steering means on said control unit and the motor of each steering apparatus, said follow-up steering control including means adjusted in accordance with the position of each chassis on the transporter for causing the steering apparatus of each chassis to bring the associated wheels substantially into a plane that is perpendicular to the radius from a common turning point, for each position of said manually operated steering means.

17. The transporter of claim 16, wherein said follow-up steering control also includes means for causing the steering apparatus of each chassis to bring the associated wheels substantially into the same plane, for each position of said manually operated steering means.

18. A modular pneumatic tired transporter comprising a plurality of end and intermediate modular unit chassis, each chassis having a frame, a king post rotatably mounted in said frame, axle means projecting laterally from said king post, a pair of pneumatic tired wheels mounted on said axle means, steering apparatus on said frame for turning said king post, means for connecting a plurality of said chassis together end to end, an electric wheel drive assembly on a plurality of said chassis, the frames of said end chassis each having a downwardly projecting extension, a motor-generator unit for a plurality of chassis mounted on the extension of said end chassis, electric motors for driving the steering apparatus of each chassis, means for operating the end chassis steering motors more rapidly than the intermediate chassis steering motor, a control unit for a plurality of chassis mounted on an end chassis, said control unit including manually operated steering means, and a follow-up steering control connected between the steering means of said control unit and the motor of each steering apparatus, said steering control including means for causing the steering apparatus of each chassis to bring the associated wheels substantially into a plane that is perpendicular to the radius from a common turning point, for each position of said manually operated steering means.

19. A sub-chassis for a modular transporter comprising a frame having upper and lower horizontal plates, a king post mounting tube depending from said lower plate, a king post having an upper stub shaft rotatable in said frame plates and a depending sleeve projecting down from said stub shaft and through said tube, bearings between said sleeve and tube, said king post having an axle mounting barrel depending from said sleeve, large diameter stub axle sleeves fixed to and extending oppositely from said king post barrel, a pneumatic tire rim rotatably mounted on each axle sleeve, a drive motor unit mounted in each axle sleeve, gear reduction drive means between each motor and the associated tire rim, and a steering gear on said king post stub shaft and between said frame plates.

References Cited by the Examiner

UNITED STATES PATENTS

| | | | |
|---|---|---|---|
| 1,125,184 | 1/1915 | Schleicher | 180—23 |
| 1,190,194 | 7/1916 | Schleicher | 180—23 |
| 2,899,005 | 8/1959 | Speicher | 180—10 |

FOREIGN PATENTS 545,273  6/1956  Italy.

A. HARRY LEVY, *Primary Examiner.*

BENJAMIN HERSH, *Examiner.*

R. C. PODWIL, *Assistant Examiner.*